(12) United States Patent
Poppe et al.

(10) Patent No.: US 9,908,994 B2
(45) Date of Patent: Mar. 6, 2018

(54) VALVE MEMBER

(71) Applicant: Altachem NV, Harelbeke (BE)

(72) Inventors: Jean-Marie Poppe, Heule (BE); Jordi Demey, Oeselgem (BE)

(73) Assignee: Altachem NV, Harelbeke (BE)

( * ) Notice: Subject to any disclaimer, the term of this patent is extended or adjusted under 35 U.S.C. 154(b) by 132 days.

(21) Appl. No.: 14/900,394

(22) PCT Filed: Jun. 24, 2014

(86) PCT No.: PCT/EP2014/063313
§ 371 (c)(1),
(2) Date: Dec. 21, 2015

(87) PCT Pub. No.: WO2014/206999
PCT Pub. Date: Dec. 31, 2014

(65) Prior Publication Data
US 2016/0280888 A1 Sep. 29, 2016

(30) Foreign Application Priority Data
Jun. 28, 2013 (EP) .................................. 13174212

(51) Int. Cl.
*C08L 23/06* (2006.01)
*C08L 23/08* (2006.01)
(Continued)

(52) U.S. Cl.
CPC ............... *C08K 7/10* (2013.01); *B65D 83/48* (2013.01); *C08K 3/34* (2013.01); *C08K 5/092* (2013.01);
(Continued)

(58) Field of Classification Search
CPC .......... C08L 67/00; C08L 69/00; C08L 23/04; C08L 23/08; C08L 23/06
See application file for complete search history.

(56) References Cited

U.S. PATENT DOCUMENTS

| RE31,992 E | * | 9/1985 | Ancker | ................... | C08K 9/04 523/200 |
| 4,722,358 A | * | 2/1988 | Christensen | ............. | A62C 5/02 137/101.11 |

(Continued)

FOREIGN PATENT DOCUMENTS

| CN | 101305055 A | 11/2008 |
| CN | 101906250 A * | 12/2010 |

(Continued)

OTHER PUBLICATIONS

Machine translated English language equivalent for JP 2008-063498 (Mar. 2008, 11 pages).*

(Continued)

*Primary Examiner* — Brieann R Johnston
(74) *Attorney, Agent, or Firm* — Collard & Roe, P.C.

(57) ABSTRACT

The present invention relates to a valve member for a dispenser valve for foam products, and in particular for a dispenser valve for polyurethane foam container, comprising a valve member that is moveable relative to a sealing. It also relates to such a dispenser valve and to a foam container.

In order to provide alternative materials for valve members, it is proposed according to the invention that the valve member is made of plastic material filled with basalt particles in an amount between 1% and 60% by weight.

It has been surprisingly found that valve members made of plastic filled with basalt particles in these amounts show improved properties, such as strength and abrasion rates, compared to non-filled plastics and compared to glass-filled plastics.

9 Claims, 1 Drawing Sheet

(51) Int. Cl.

| | |
|---|---|
| *C08L 23/04* | (2006.01) |
| *C08K 3/34* | (2006.01) |
| *C08K 7/10* | (2006.01) |
| *B65D 83/48* | (2006.01) |
| *C08K 5/092* | (2006.01) |
| *C08K 9/10* | (2006.01) |
| *B65D 83/46* | (2006.01) |

(52) U.S. Cl.
CPC ............... *C08K 9/10* (2013.01); *C08L 23/04* (2013.01); *C08L 23/06* (2013.01); *C08L 23/08* (2013.01); *B65D 83/46* (2013.01); *C08K 2201/004* (2013.01); *C08K 2201/016* (2013.01)

(56) References Cited

U.S. PATENT DOCUMENTS

| | | | |
|---|---|---|---|
| 4,873,116 A | | 10/1989 | Ancker |
| 7,984,834 B2 * | | 7/2011 | McBroom ............... B65D 83/14 |
| | | | 222/402.1 |
| 8,511,521 B1 | | 8/2013 | McBroom et al. |
| 2004/0260046 A1 | | 12/2004 | Smith et al. |
| 2010/0249307 A1 * | | 9/2010 | Stoppelmann ........... C08L 77/00 |
| | | | 524/423 |

FOREIGN PATENT DOCUMENTS

| | | |
|---|---|---|
| EP | 0 262 649 A2 | 4/1988 |
| EP | 1 930 374 A1 | 6/2008 |
| EP | 2 354 037 A1 | 8/2011 |
| EP | 1 789 343 B1 | 11/2011 |
| JP | 2004217741 A * | 8/2004 |
| JP | 2008063498 A * | 3/2008 |
| RU | 2540406 C2 * | 2/2015 |

OTHER PUBLICATIONS

Singha (A Short Review on Basalt Fiber. International Journal of Textile Science, 1(4), 2012, pp. 19-28).*
Bashtannik (The Effect of Adhesion Interaction on the Mechanical Properties of the Thermoplastic Basalt Plastics. Mechanics of Composite Materials, 39(1), 2003, pp. 85-88).*
Machine translated English language equivalent of JP 2004217741 (Aug. 2004, 5 pages).*
Derwent Abstract of RU 2540406 (Acc. No. 2015-12138G, Feb. 2015, 2 pages).*
Derwent Abstract of CN 101906250 (Acc. No. 2011-A42900, Dec. 8, 2010, 3 pages).*
International Search Report of PCT/EP2014/063313, dated Jul. 14, 2014.
Akinci, A. et al. "Wear Behavior of Basalt Filled Low Density Polyethylene Composites." Applied Composite Materials, Kluwer Academic Publishers, DO, vol. 19, No. 3-4, Jun. 14, 2011, pp. 499-511.
Horiba Scientific. "A Guidebook to Particle Size Analysis." Jan. 1, 2012, 16 pages, XP-055060732.
Linsinger, T. et al. "JRC Reference Reports, Requirements on measurements for the implementation of the European Commission definition of the term 'nanomaterial'." Jul. 1, 2012, pp. 1-52, XP-055113112.
English translation of DIN EN ISO 527-2, Determination of tensile properties of plastics—Test conditions for moulding and extrusion plastics (ISO 527-2: 1993, including Corr 1: 1994), Jul. 1996, total of 7 pages.

* cited by examiner

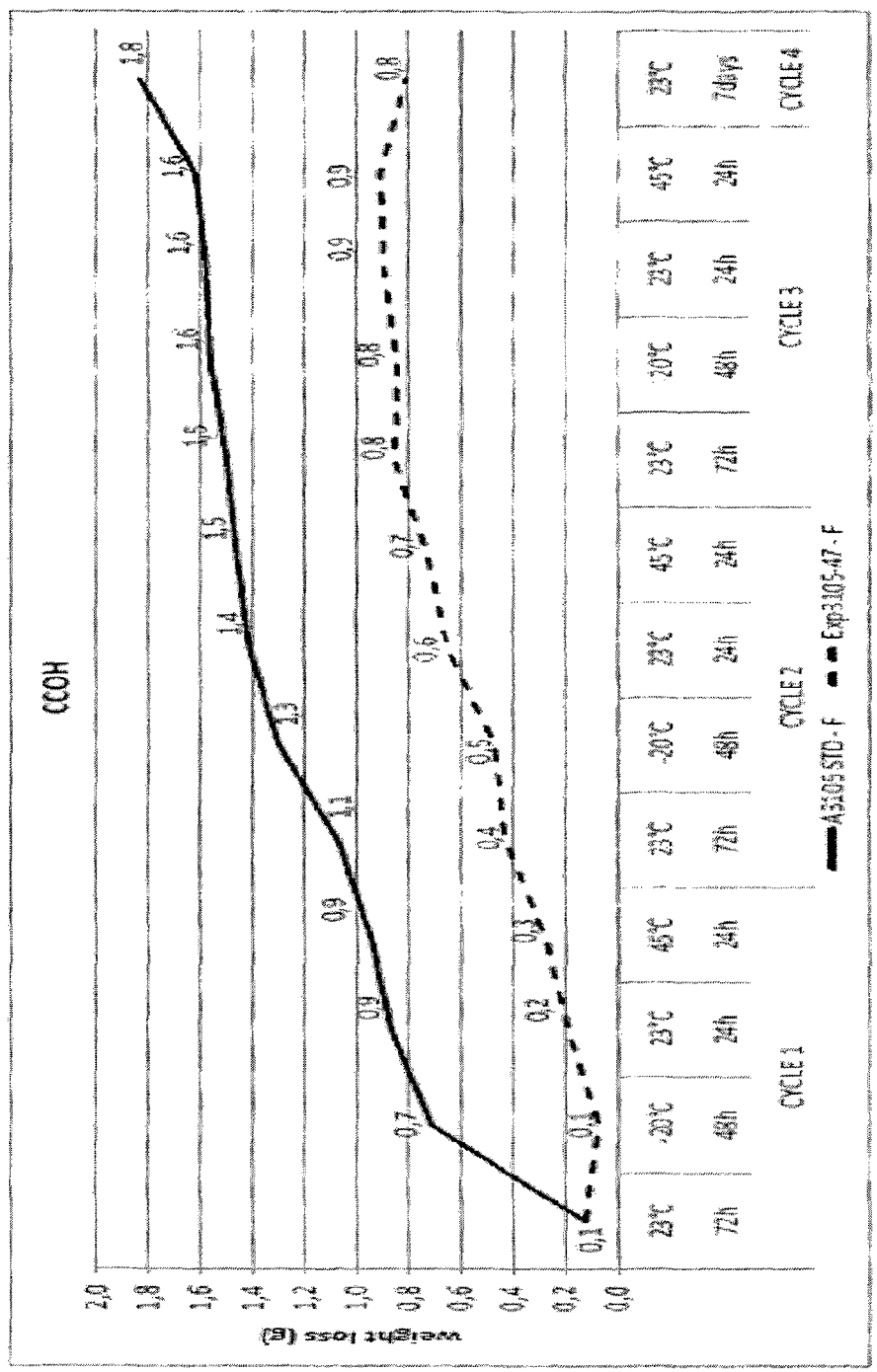

VALVE MEMBER

CROSS REFERENCE TO RELATED APPLICATIONS

This application is the National Stage of PCT/EP2014/063313 filed on Jun. 24, 2014, which claims priority under 35 U.S.C. § 119 of European Application No. 13174212.4 filed on Jun. 28, 2013, the disclosures of which are incorporated by reference. The international application under PCT article 21(2) was published in English.

The present invention relates to a valve member for a dispenser valve for foam products, and in particular for a dispenser valve for polyurethane foam container, comprising a valve member that is moveable relative to a sealing. It also relates to such a dispenser valve and to a foam container.

Foams such as polyurethane foam have found wide application in the building sector, e.g. as fillers and insulators. There are one component (1K) and two component (2K) polyurethane foams, the first one being moisture curable, whereas the second one does not need moisture to cure. Both kinds of polyurethane foams are generally packaged in aerosol cans with a dispenser valve. When the dispenser valve is actuated by the user, the valve member is moved and allows the foam to be dispensed. The valve member being the most solicited piece of the dispenser valve, it has to be resistant enough over the lifetime of the dispenser valve.

Furthermore, there is the problem of sticking in the case of 1K and 2K polyurethane foams. If moisture migrates through the dispenser valve into the aerosol can, the foam cures around the valve member and it interferes with the operation of the valve, sealing it while it is closed.

It is common knowledge that glass-filled polyolefin is more resistant than polyolefin without glass fill. A valve member made of a glass filled polyethylene having a glass content in an amount between 3 and 30% is known from EP 1 789 343 B1. This valve member is described to be more resistant to failure from moisture infiltration than valve member without glass fill. However, the surface roughness of glass-filled materials is not satisfying for all technical applications and leads to an increased abrasion of the production tools and assembly lines.

EP 262 649 A2 describes a method of preparing mixtures of incompatible thermoplastic hydrocarbon polymers using a compatibilizing mixture comprising a basalt filler and certain reinforcement additives.

The gas loss problem is addressed in EP 2 354 037 A1 in which the valve member comprises an annular base flange with an additional layer for improved sealing against the lower surface of the grommet flange. This guarantees besides good resistance to sticking a good prevention of gas loss, but the costs of the valve member are rather high for a commodity product such as containers containing moisture curable compositions such as polyurethane.

It can be stated that, although solutions have been proposed, there remains a need to reduce production costs and ensure at the same time an optimal stability, strength, sticking resistance and gas loss properties of the valve.

The objective of the present invention is therefore to provide materials for valve members fulfilling these criteria.

This objective is achieved according to the present invention in that the valve member is made of plastic material filled with basalt particles in an amount between 1% and 60% by weight.

It has been surprisingly found that valve members made of plastic filled with basalt particles in these amounts show improved properties, such as strength and abrasion rates, compared to non-filled plastics and compared to glass-filled plastics.

A preferred embodiment of the present invention is that the basalt particles are selected from the group comprising basalt particles, mica particles, wollastonite particles and talcum particles.

The best results were achieved in tests with basalt fibres. However, the other varieties of particles also show sufficient resistance.

An improvement of the present invention consists in the fact that a compatibilizing agent is added to the plastic material.

In fact, the addition of a compatibilizing agent improves the adhesion between the plastic and the basalt particles.

It is within the scope of the present invention that the compatibilizing agent is selected from the group consisting of maleic acid, a condensation product of maleic acid with an aliphatic, aromatic or heterocyclic polyol, an acrylamide maleimide or maleamic acid of an aliphatic, aminosilanes, alkylsilanes, aromatic or heterocyclic polyamine and titanium dioxide.

It has been found that derivatives of maleic acid as well as aminosilanes, alkylsilanes, aromatic or heterocyclic polyamine are very suitable compatibilizing agents for improving the adhesion between plastics and basalt particles.

According to the present invention, the plastic is selected from the group consisting of polyolefins, polyesters, and polyoxymethylene.

It is preferred that the polyolefins are selected from the group comprising polyethylene, polypropylene, medium density polyethylene, medium density polypropylene, high density polyethylene, high density polypropylene and metallocene polyethylene.

The preferred plastic materials for the valve member are polyethylene and especially high-density polyethylene since these materials have been used successfully for many years for valve members and they are available at reasonable prices on the market.

Preferred polyesters are polyethylene terephthalate and polybutylene terephthalate.

According to a preferred embodiment of the present invention, the basalt particles are in form of basalt fibres, basalt powder or basalt nanopowder.

In this context, it is preferred that the basalt fibres have a mean length between 0.1 and 12 mm, preferably between 1 and 8 mm and most preferably between 2 and 6 mm.

Width/length ratios of the basalt fibres between 1:20 and 1:500, preferably between 1:50 and 1:250 and most preferably between 1:100 and 1:200 has given the best results.

It is preferred that the basalt powder has a mean particle size between 0.1 mm and 10 mm, preferably between 1 and 8 mm and most preferably between 3 and 6 mm.

Both for basalt fibres and basalt particles it is preferred that the length respectively the mean particle size is about the same as the length of the plastic granulates used for producing the valve members.

Concerning the basalt nanopowder, the mean particle size is between 1 nm and 100 nm, preferably between 10 nm and 50 nm and most preferably between 20 nm and 30 nm.

Preferably, the valve member is made of plastic material filled with basalt particles in an amount between 1% and 50% by weight, more preferably in an amount between 5 and 40% by weight and most preferably in an amount between 10 and 35% by weight.

The invention also relates to a dispenser valve for foam products, comprising a valve member that is moveable relative to a sealing, the valve member being a valve member according to the present invention.

A preferred embodiment of the invention is that the dispenser valve is a dispenser valve for one component or two component polyurethane foam.

One component (1K-) or two component (2K-) polyurethane foam is widely used in industry and in the building sector.

The invention further relates to a foam container with a dispenser valve, the dispenser valve being a dispenser valve according to the present invention.

In the following, preferred embodiments of the invention are explained in detail.

EXAMPLE 1

A valve member is made from plastic granulates consisting of high density polyethylene and long basalt fibres. The plastic granulates have a mean size of about 9 mm and are filled with 33% by weight of basalt fibres having a mean length that corresponds essentially to the size of the plastic granulates (about 8 mm) and a mean diameter of 17 µm. The basalt fibres have an epoxy coating and maleic acid is used as compatibilizing agent.

The valve member produced by injection moulding of the above-mentioned composition is used in a dispenser valve on 1K- or 2K-polyurethane foam container. It shows better mechanical resistance (stress at break (DIN EN 527): 80 MPa, strain at break (DIN EN 527): 3%, tensile modulus (DIN EN 527): 5800 MPa) and less sticking, i.e. less likeliness that the contents of the container which have inadvertently cured adhere to the valve member and interfere with the operation of the valve than conventional valve members.

EXAMPLE 2

A valve member is made from plastic granulates consisting of high density polyethylene and short basalt fibres. The plastic granulates have a mean size of about 9 mm and are filled with 33% by weight of basalt fibres having a mean length of about 1 mm) and a mean diameter of 17 µm. Maleic acid is used as compatibilizing agent.

The valve member produced by injection moulding of the above-mentioned composition is used in a dispenser valve on 1K- or 2K-polyurethane foam container. It shows better mechanical resistance (stress at break (DIN EN 527): 80 MPa, strain at break (DIN EN 527): 3%, tensile modulus (DIN EN 527): 5800 MPa) and less sticking, i.e. less likeliness that the contents of the container which have inadvertently cured adhere to the valve member and interfere with the operation of the valve than conventional valve members.

EXAMPLE 3

A valve member is made from plastic granulates consisting of polyethylene and long basalt fibres. The plastic granulates have a mean size of about 9 mm and are filled with 33% by weight of basalt fibres having a mean length that corresponds essentially to the size of the plastic granulates (about 8 mm) and a mean diameter of 17 µm. The basalt fibres have an epoxy coating and maleic acid is used as compatibilizing agent.

The valve member produced by injection moulding of the above-mentioned composition is used in a dispenser valve on 1K- or 2K-polyurethane foam container. It shows better mechanical resistance (stress at break (DIN EN 527): 80 MPa, strain at break (DIN EN 527): 3%, tensile modulus (DIN EN 527): 5800 MPa) and less sticking, i.e. less likeliness that the contents of the container which have inadvertently cured adhere to the valve member and interfere with the operation of the valve than conventional valve members.

FIG. 1 shows the result of a cycling test.

In a cycling test, cans were stored upside down with gas on different temperatures so that the valve was in direct contact with the gas. On the x axis, the different cycles and temperatures to which the cans were exposed are shown, for example Cycle 1

72 h at 23° C.
48 h at −20° C.
24 h at 23° C.
24 h at 45° C.

Cycle 4

7 days at 23° C., can upright.

After each cycle step, the gas loss is measured and indicated on the y-axis of FIG. 1 in g.

The cycle test was executed with a standard valve (A3105) the valve member (valve stem) of which is made of polyethylene filled with 33 weight % of glass fibres and with a valve provided with a valve stem made of polyethylene filled with 33 weight % basalt fibres (EXP3105-47).

It can be seen from the results that valve with the basalt-filled valve stem (upper curve) shows less gas loss than the standard valve filled with glass fibres (lower curve).

The invention claimed is:

1. Dispenser valve for polyurethane foam, comprising a valve member movable relative to a sealing, wherein the valve member comprises plastic material selected from the group consisting of high density polyethylene and high density polypropylene filled with basalt particles in an amount between 1% and 60% by weight, and wherein the basalt particles are in the form of basalt fibers having a mean length between 0.1 and 12 mm.

2. Dispenser valve according to claim 1 wherein a compatibilizing agent is added to the plastic material.

3. Dispenser valve according to claim 2, wherein the compatibilizing agent is selected from the group consisting of maleic acid, a condensation product of maleic acid with an aliphatic polyol, with an aromatic polyol, or with a heterocyclic polyol, an acrylamide maleimide or maleamic acid of an aliphatic polyamine, of an aromatic polyamine, of a heterocyclic polyamine, of aminosilanes, or of alkylsilanes, and titanium dioxide.

4. Dispenser valve according to claim 1, wherein the basalt particles are in form of basalt fibres, of basalt powder or of basalt nanopowder.

5. Dispenser valve according to claim 1, wherein the basalt fibers have a mean width/length ratio of between 1:20 and 1:500.

6. Dispenser valve according to claim 1, wherein the valve member is made of plastic material filled with basalt particles in an amount between 1% and 50% by weight.

7. Container for storing foam comprising a dispenser valve, wherein the dispenser valve is a dispenser valve according to claim 1.

8. Dispenser valve for polyurethane foam, comprising a valve member movable relative to a sealing,
- wherein the valve member comprises plastic material selected from the group consisting of high density polyethylene and high density polypropylene filled with basalt particles in an amount between 1% and 60% by weight, and
- wherein the basalt particles are in the form of basalt powder having a mean particle size between 0.1 mm and 10 mm.

9. Dispenser valve for polyurethane foam, comprising a valve member movable relative to a sealing,
- wherein the valve member comprises plastic material selected from the group consisting of high density polyethylene and high density polypropylene filled with basalt particles in an amount between 1% and 60% by weight, and
- wherein the basalt particles are in the form of basalt nanopowder having a mean particle size between 1 nm and 100 nm.

* * * * *